United States Patent
Rajmohan et al.

(10) Patent No.: US 11,128,390 B1
(45) Date of Patent: Sep. 21, 2021

(54) ANTENNA-FREE RECEIVER BIT ERROR RATE TESTING

(71) Applicant: Texas Instruments Incorporated, Dallas, TX (US)

(72) Inventors: Kiran Rajmohan, Ernakulam (IN); Kalyan Chakravarthi Chekuri, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 16/929,352

(22) Filed: Jul. 15, 2020

(51) Int. Cl.
| | |
|---|---|
| *H04B 7/08* | (2006.01) |
| *H04B 17/29* | (2015.01) |
| *H04L 27/02* | (2006.01) |
| *H04L 25/03* | (2006.01) |
| *H04B 17/00* | (2015.01) |

(52) U.S. Cl.
CPC ......... *H04B 17/29* (2015.01); *H04B 17/0085* (2013.01); *H04L 25/03834* (2013.01); *H04L 27/02* (2013.01)

(58) Field of Classification Search
CPC .. H04B 7/0868; H04B 7/0456; H04B 7/0617; H04L 27/2675

USPC ........................................................ 375/224
See application file for complete search history.

(56) References Cited

U.S. PATENT DOCUMENTS

| | | | | |
|---|---|---|---|---|
| 5,546,325 | A * | 8/1996 | Aulet | H04B 10/07 398/202 |
| 2003/0112425 | A1* | 6/2003 | Franke | G01M 11/33 356/73.1 |

* cited by examiner

*Primary Examiner* — Fitwi Y Hailegiorgis
(74) *Attorney, Agent, or Firm* — Ronald O. Neerings; Charles A. Brill; Frank D. Cimino

(57) ABSTRACT

A test system and interface circuitry for antenna-free bit error rate testing of an electronic device under test, including a pulse shaping circuit with a pulse shaping filter circuit to pulse shape a modulating signal before amplitude modulation with a carrier signal, and the amplitude modulated signal is coupled directly or via a transformer and a socket to the device under test without antennas to facilitate automated device testing with simple reconfiguration of signal generators for different device type. A method includes filtering a square wave modulating signal to create a pulse shaped modulating signal, amplitude modulating a carrier signal with the pulse shaped modulating signal to create an amplitude modulated signal, providing the amplitude modulated signal to the socket, and evaluating a bit error rate of the DUT according to receive data from the DUT and according to the BER test transmit data.

20 Claims, 3 Drawing Sheets

ANTENNA-FREE RECEIVER BIT ERROR RATE TESTING

BACKGROUND

Wireless receivers are used in a variety of products and systems, such as vehicle passive keyless entry (PKE) systems. A wireless receiver is mounted in a vehicle key or fob and exchanges wireless signals with a transmitter in the vehicle. The communication includes authentication at a relatively low frequency, such as 134.2 kHz using amplitude shift keyed (ASK) data. The distance between the vehicle and the key can be estimated from a received signal strength indicator (RSSI) according to a security protocol. PKE systems are being refined for operation at increased distances. The key or fob receiver systems are battery powered and are designed to operate at low power, and it is desirable to support low voltage signals, such as 100 uV signal detection with high (e.g., 46 dB) blocker signals to increase the range, for example, from 30 m to 100 m. It is further desirable to implement receiver chip final testing that accounts for performance with actual use transmit and receive antennas. However, test setups that use amplitude modulation followed by wireless transmission and receipt by actual antennas are not well suited for high volume, high throughput automated parametric testing with antenna artifacts, including bit error rate (BER) testing. System calibration cannot be done using antennas as the amplitude and shape of the received signal is distorted by changing Q-factor when measuring equipment is connected, such as connection of scope probes with associated capacitance. Moreover, testing using actual use antennas needs a shielded setup, and measurements are unreliable as angle and distance need to be precise. Precise tuning is highly time consuming and must be done for every frequency and Q factor. Furthermore, noise pickup makes measurement unreliable especially at low signal amplitudes (e.g., 25 uV, etc.). In addition, interference issues render multisite and multichannel testing difficult. However, testing receiver chips without actual use antennas can lead to inaccurate results. For example, BER testing involves decoding the bit stream at the middle of each bit position, but the amplitude of the actual received signal from the antenna is smaller at this point due to antenna effects. BER testing without antennas would have a correspondingly higher RSSI and would overestimate device performance.

SUMMARY

In one aspect, a test system includes a pulse shaping circuit preceding a modulation circuit to provide a pulse shaped modulated signal for antenna-free coupling to a device under test (DUT) in a socket. In one implementation, the pulse shaping circuit includes a pulse shaping circuit input terminal adapted to be coupled to a modulating signal generator output, a pulse shaping circuit output terminal, and a pulse shaping filter circuit coupled between the pulse shaping circuit input terminal and the pulse shaping circuit output terminal. In one implementation, the pulse shaping filter circuit is a first order low pass filter, such as a filter resistor having a first terminal coupled to the first buffer output terminal and a second terminal coupled to the second buffer input terminal, as well as a filter capacitor having a first terminal coupled to the second buffer input terminal and a second terminal coupled to a reference node. In other implementations, the pulse shaping filter circuit is a second or higher order filter. The modulation circuit includes a modulating signal input terminal coupled to the pulse shaping circuit output terminal, a carrier signal input terminal adapted to be coupled to a carrier signal generator output terminal, and a modulator output terminal. In one example, the test system includes a transformer and a socket adapted to be coupled to the DUT. The transformer includes a primary winding coupled to the modulator output terminal, and a secondary winding. The socket in one example includes a signal input terminal coupled to the secondary winding. In another example, the transformer is omitted, and the signal input terminal of the socket is coupled to the modulator output terminal.

In one example, the test system includes a mixer circuit with a mixer input terminal coupled to the modulator output terminal and a mixer output terminal coupled to the signal input terminal of the socket directly or through a transformer and/or buffer. The mixer circuit also includes a resistor coupled between the mixer input terminal and the mixer output terminal, a first resistor coupled between a first sideband signal generator output terminal and the mixer output terminal, and a second resistor coupled between a second sideband signal generator output terminal and the mixer output terminal. In this or another example, the test system further includes first and second buffers. The first buffer includes a first buffer input terminal coupled to the pulse shaping circuit input terminal, and a first buffer output terminal coupled to the pulse shaping filter circuit. The second buffer includes a second buffer input terminal coupled to the pulse shaping filter circuit, and a second buffer output terminal coupled to the pulse shaping circuit output terminal. In one implementation, the test system further includes a third buffer having a third buffer input terminal coupled to the mixer output terminal, and a third buffer output terminal coupled to the signal input terminal of the socket directly or through a transformer.

In this or another example, the test system includes an electronic memory and a processor that is configured to execute a test program stored in the electronic memory. In this or another example, the test system also includes first and second signal generators. The first signal generator includes a first signal generator output coupled to the modulating signal generator output, a data input coupled to the processor to receive bit error rate test transmit data, and a modulating frequency input coupled to the processor to receive a modulating frequency adjustment input signal to set a signal frequency of a modulating signal at the modulating signal generator output. The second signal generator includes a second signal generator output coupled to the carrier signal input terminal of the modulation circuit, and a carrier frequency input coupled to the processor to receive a carrier frequency adjustment input signal to set a carrier frequency of a carrier signal at the carrier signal input terminal. In one example, the socket includes a signal output terminal coupled to the processor to provide bit error rate test receive data from the DUT.

In another aspect, a circuit includes a pulse shaping circuit, an amplitude modulator, and a socket adapted to be coupled to a device under test. The pulse shaping circuit includes a first buffer, a pulse shaping filter circuit, and a second buffer. The first buffer includes a first buffer input terminal adapted to be coupled to a modulating signal generator output, and a first buffer output terminal. The pulse shaping filter circuit includes a filter input terminal coupled to the first buffer output terminal, and a filter output terminal. The second buffer includes a second buffer input terminal coupled to the filter output terminal, and a second buffer output terminal. The amplitude modulator includes a modulating signal input terminal coupled to the second buffer output terminal, a carrier signal input terminal adapted to be coupled to a carrier signal generator output terminal, and a modulator output terminal. In one example, a third buffer includes a third buffer input terminal coupled to the modulator output terminal, and a third buffer output terminal. In this or another example, the circuit includes a transformer having a primary winding coupled to the third buffer output terminal, and a secondary winding. In this or another example, the socket includes a signal input terminal coupled to the secondary winding or directly to the third buffer output terminal or directly to the modulator output terminal, and a signal output terminal adapted to be coupled to a processor.

In one example, the circuit includes a mixer circuit having a mixer input terminal coupled to the modulator output terminal and a mixer output terminal coupled to the primary winding or directly to the signal input terminal of the socket. The mixer circuit also includes a resistor coupled between the mixer input terminal and the mixer output terminal, a first resistor coupled between a first sideband signal generator output terminal and the mixer output terminal, and a second resistor coupled between a second sideband signal generator output terminal and the mixer output terminal.

In one example, the pulse shaping filter circuit is a first order low pass filter. In one implementation, the pulse shaping filter circuit includes a filter resistor and a filter capacitor. The filter resistor includes a first terminal coupled to the first buffer output terminal, and a second terminal coupled to the second buffer input terminal. The filter capacitor includes a first terminal coupled to the second buffer input terminal, and a second terminal coupled to a reference node.

In another aspect, a method includes coupling a device under test to a socket, generating a square wave modulating signal according to bit error rate test transmit data, filtering the square wave modulating signal to create a pulse shaped modulating signal, and amplitude modulating a carrier signal with the pulse shaped modulating signal to create an amplitude modulated signal. In one example, the method also includes providing the amplitude modulated signal to the socket, and evaluating a bit error rate of the device under test according to receive data from the device under test and according to the bit error rate test transmit data. In one implementation of this or another example, the method also includes buffering the square wave modulating signal to create a buffered square wave modulating signal, filtering the buffered square wave modulating signal to create the pulse shaped modulating signal, buffering the pulse shaped modulating signal to create a buffered pulse shaped modulating signal, and amplitude modulating the carrier signal with the buffered pulse shaped modulating signal to create the amplitude modulated signal. In one implementation of this or another example, the method also includes mixing the amplitude modulated signal with a sideband signal to create a sideband blocked amplitude modulated signal, buffering the sideband blocked amplitude modulated signal to create a buffered sideband blocked amplitude modulated signal, and providing the buffered sideband blocked amplitude modulated signal to the socket.

DETAILED DESCRIPTION

Figure 1:
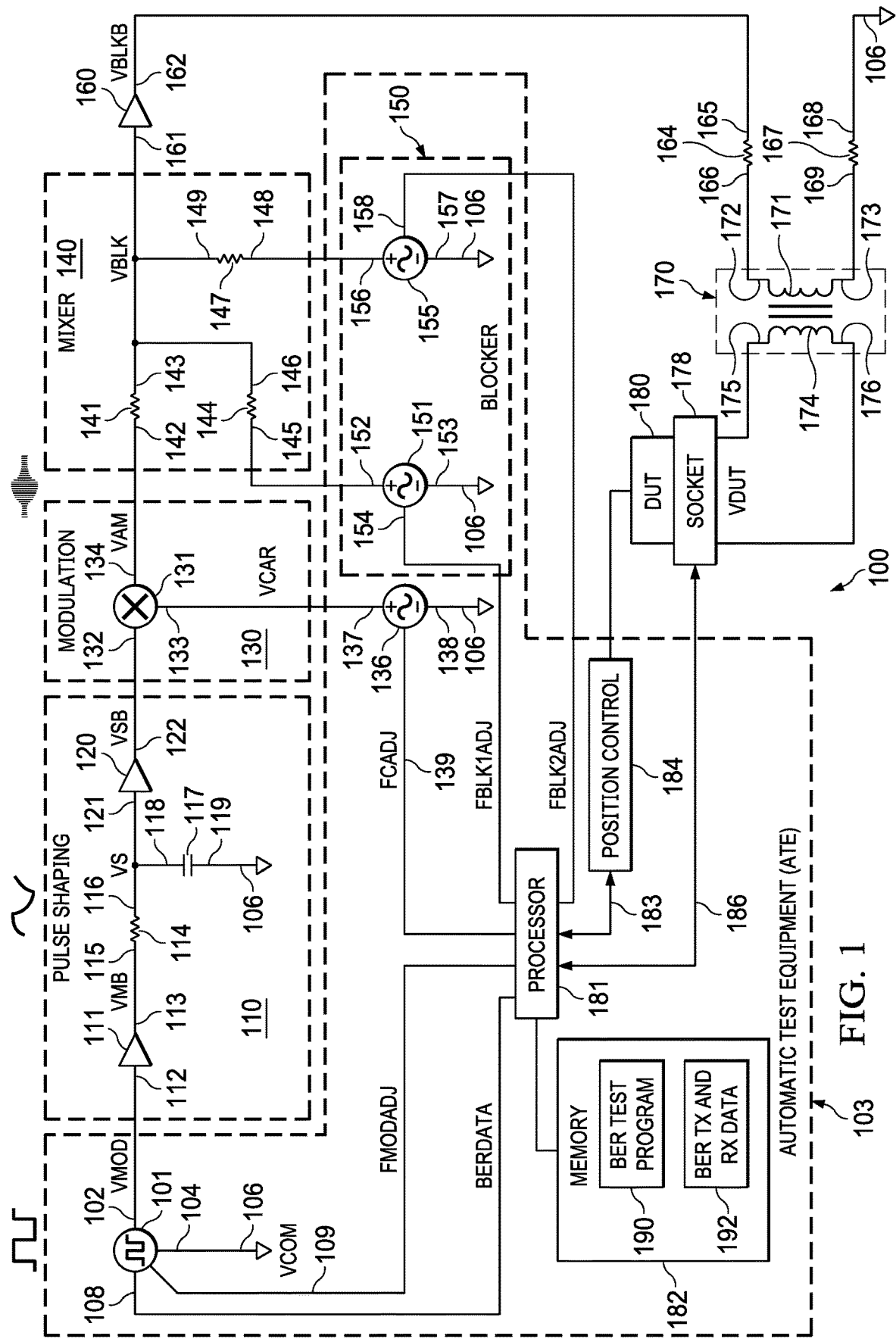
FIG. 1 is a schematic diagram of a final test system for bit error rate (BER) testing using direct connection to receiver electronic devices.

In the drawings, like reference numerals refer to like elements throughout, and the various features are not necessarily drawn to scale. Also, the term "couple" or "couples" includes indirect or direct electrical or mechanical connection or combinations thereof. For example, if a first device couples to or is coupled with a second device, that connection may be through a direct electrical connection, or through an indirect electrical connection via one or more intervening devices and connections. One or more operational characteristics of various circuits, systems and/or components are hereinafter described in the context of functions which in some cases result from configuration and/or interconnection of various structures when circuitry is powered and operating.

FIG. 1 shows an example final test system 100 configured for bit error rate testing of electronic devices, such as receiver integrated circuits (ICs). The system 100 includes automated test equipment (ATE) and interface circuitry 110, 130, 140 with antenna-free signal coupling between the system 100 and the receiver electronic devices to facilitate high volume performance testing including BER testing. Unlike testing with actual use antennas, the system 100 provides pulse shaping of a modulation pulse prior to amplitude modulation to emulate antenna effects with antenna-free connection to the tested DUT to provide reliable BER test results together with high volume, high speed automated device parametric testing suitable for final test at an integrated circuit manufacturing facility.

The system 100 includes a first signal generator 101 that includes a first signal generator output, also referred to herein as a modulating signal generator output 102. In the illustrated example, the first signal generator 101 is included in ATE 103 along with processing components and other signal generators. The first signal generator 101 has a reference terminal 104 coupled to a reference node 106 having a common or reference voltage VCOM (e.g., a circuit ground reference voltage). The first signal generator 101 also has a data input 108 configured to receive bit error rate test transmit data BERDATA. In operation when powered, the first signal generator 101 generates a square wave modulating signal VMOD at the modulating signal generator output 102 according to the bit error rate test transmit data BERDATA. The first signal generator 101 also has a modulating frequency input 109 configured to receive a modulating frequency adjustment input signal FMODADJ to set a signal frequency $f_s$ of the modulating signal VMOD at the modulating signal generator output 102. In one example, the data input 108 and the modulating frequency input 109 are coupled to a processor of the ATE 103 as described further below.

The final test system 100 includes a pulse shaping circuit 110 with a first buffer 111 having a first buffer input terminal coupled to a pulse shaping circuit input terminal 112 that is adapted to be coupled to the modulating signal generator output 102. In the example of FIG. 1, the first signal generator 101 is a waveform generator implemented in hardware and/or software/firmware of the ATE 103. The pulse shaping circuit 110 is part of an interface circuit (e.g., a printed circuit board or PCB assembly) with a connector configured to plug into a connector of the ATE 103, and the pulse shaping circuit input terminal 112 is directly coupled to the modulating signal generator output 102. Rather than modulating the square wave pulse modulating signal VMOD at the modulating signal generator output 102 for testing a DUT, the pulse shaping circuit 110 shapes the square wave pulse modulating signal VMOD prior to amplitude modulation.

The first buffer 111 also includes a first buffer output terminal 113 coupled to provide a buffered square wave modulating signal VMB to a first order low pass pulse shaping filter circuit. In other implementations, the pulse shaping filter circuit is a second or higher order filter, such as a low pass filter, a band pass filter, etc. The pulse shaping filter circuit in FIG. 1 includes a filter resistor 114 with a first terminal 115 coupled to the first buffer output terminal 113 and a second terminal 116, as well as a filter capacitor 117 having a first terminal 118 coupled to the second terminal 116 of the filter resistor 114 and a second terminal 119 coupled to the reference node 106. The pulse shaping filter circuit 114, 117 creates a pulse shaped modulating signal VS by low pass filtering the received buffered square wave modulating signal VMB. In this example, the modulating signal generator output 102 is coupled to the pulse shaping filter circuit through the first buffer 111. In another implementation, the first buffer 111 is omitted and the modulating signal generator output 102 is coupled directly to the pulse shaping circuit input terminal 112.

The pulse shaping circuit 110 in FIG. 1 further includes a second buffer 120 having a second buffer input terminal 121 coupled to the second terminal 116 of the filter resistor 114 and to the first terminal 118 of the filter capacitor 117. The second buffer 120 includes a second buffer output terminal that forms a pulse shaping circuit output terminal 122. The second buffer 120 buffers the pulse shaped modulating signal VS from the pulse shaping filter circuit 114, 117 to create a buffered pulse shaped modulating signal VSB at the pulse shaping circuit output terminal 122. In this example, the pulse shaping circuit output terminal 122 is coupled to the pulse shaping filter circuit 114, 117 through the second buffer 120. In another implementation, the second buffer 120 is omitted and the pulse shaping circuit output terminal 122 is coupled directly to the second terminal 116 of the filter resistor 114 and to the first terminal 118 of the filter capacitor 117 to provide the pulse shaped modulating signal VS at the pulse shaping circuit output terminal 122.

The system 100 includes a modulation circuit 130 that amplitude modulates a sinusoidal carrier signal VCAR with the buffered pulse shaped modulating signal VSB (or with the pulse shaped modulating signal VS in implementations where the second buffer 120 is omitted) to create an amplitude modulated signal VAM. The modulation circuit 130 includes an amplitude modulator 131 with a modulating signal input terminal 132 coupled to the pulse shaping circuit output terminal 122 (e.g., to the second buffer output terminal in the example of FIG. 1). The amplitude modulator 131 also includes a carrier signal input terminal 133 and a modulator output terminal 134. In one example, the ATE 103 includes a second signal generator 136 having a second signal generator output 137 coupled to provide the sinusoidal carrier signal VCAR to the carrier signal input terminal 133 of the modulation circuit 130. The second signal generator 136 includes a carrier frequency input 139 configured to receive a carrier frequency adjustment input signal FCADJ to set a carrier frequency $f_c$ of the carrier signal VCAR at the carrier signal input terminal 133. The carrier signal input terminal 133 is adapted to be coupled to the second signal generator output terminal 137, for example, through board mounted connectors and/or cables that connect the interface circuitry with the ATE 103.

The test system 100 in FIG. 1 includes a mixer circuit 140 to combine or mix the amplitude modulated signal VAM with one or more sideband blocker signals and create a sideband blocked amplitude modulated signal VBLK. The mixer circuit 140 includes a mixer input terminal coupled to the modulator output terminal 134, a voltage divider resistor 141 with a first terminal 142 coupled to the mixer input terminal, and a second terminal 143 coupled to a mixer output terminal. The mixer circuit 140 also includes a first resistor 144 with a first terminal 145 coupled to a first sideband signal generator output terminal and a second terminal 146 coupled to the mixer output terminal, as well as a second resistor 147 with a first terminal 148 coupled to a second sideband signal generator output terminal and a second terminal 149 coupled to the mixer output terminal.

The ATE 103 in this example includes a blocker circuit 150 of the ATE 103 that includes a third signal generator 151 having a first sideband signal generator output terminal 152 coupled to provide a sinusoidal first blocker signal to the first terminal 145 of the first resistor 144 of the mixer circuit 140. The third signal generator 151 includes a reference terminal 153 coupled to the reference node 106, and a control input 154 configured to receive a first blocking frequency adjustment signal FBLK1ADJ to set the frequency of the sinusoidal first blocker signal. The blocker circuit 150 also includes a fourth signal generator 155 having a second sideband signal generator output terminal 156 coupled to provide a sinusoidal second blocker signal to the first terminal 148 of the second resistor 147 of the mixer circuit 140. The fourth signal generator 155 includes a reference terminal 157 coupled to the reference node 106, and a control input 158 configured to receive a second blocking frequency adjustment signal FBLK2ADJ to set the frequency of the sinusoidal first blocker signal. In one implementation, the first and second blocking frequency adjustment signals FBLK1ADJ and FBLK2ADJ set the respective frequencies of the first and second sideband blockers to frequencies above and below the carrier frequency $f_c$ of the carrier signal VCAR. In another implementation, only one sideband blocker signal is used, one of the signal generators 151 or 155 is omitted, and one of the resistors 144 or 147 of the mixer circuit 140 is omitted. In another implementation, the mixer circuit 140 and the signal generators 151 and 155 are omitted.

The test system 100 also includes a third buffer 160 that buffers the sideband blocked amplitude modulated signal VBLK (or the amplitude modulated signal VAM if the mixer circuit 140 is omitted) to create a buffered sideband blocked amplitude modulated signal VBLKB. The third buffer 160 includes a third buffer input terminal 161 coupled to the mixer output terminal (or directly to the modulator output terminal 134), as well as a third buffer output terminal 162 coupled to the primary winding 171. In another implementation, the third buffer 160 is omitted. The system 100 also includes a resistor 164 with a first terminal 165 coupled to the third buffer output terminal 162 and a second terminal 166. A further resistor 167 includes a first terminal 168 coupled to the reference node 106, and a second terminal 169.

The system 100 also includes a transformer 170 with a primary winding 171 coupled through the resistor 164, the third buffer 160 and the mixer circuit 140 to the modulator output terminal 134. In other implementations, the transformer 170 is omitted. The primary winding 171 has a first end 172 coupled to the second terminal 166 of the resistor 164, and a second end 173 coupled to the second terminal 169 of the resistor 167. The transformer 170 also includes a secondary winding 174 with a first end 175 and a second end 176. The system 100 further includes a socket 178 with connections to the first and second ends 175 and 176 of the transformer secondary winding 174. The socket 178 is adapted to be coupled to a device under test (DUT) 180, such as a receive chip or IC, and provides electrical connections from the second ends 175 and 176 of the transformer secondary winding 174 to receiver circuit inputs of the installed DUT 180 to provide a DUT test signal VDUT to the DUT 180 during BER and other parametric testing in the system 100.

The ATE 103 in this example includes a processor 181 operatively coupled to an electronic memory 182. The processor 181 includes outputs coupled to the respective signal generators 101, 136, 151, and 155 to control their operation during testing. The processor 181 has an output coupled to the data input 108 of the first signal generator 101 to provide the bit error rate test transmit data BERDATA of the square wave modulating signal VMOD at the modulating signal generator output 102 for pulse shaping and amplitude modulation. The processor 181 also includes an output coupled to the modulating frequency input 109 of the first signal generator 101. In one example, the processor 181 provides the modulating frequency adjustment input signal FMODADJ to the modulating frequency input 109 to set the signal frequency $f_s$ of the modulating signal VMOD at the modulating signal generator output 102. The processor 181 also has an output coupled to the carrier frequency input 139 of the second signal generator 136 to provide the carrier frequency adjustment input signal FCADJ to set the carrier frequency $f_c$ of the carrier signal VCAR at the carrier signal input terminal 133. In addition, the processor 181 has outputs coupled to the respective control inputs 154 and 158 of the third and fourth signal generators 151 and 155. In operation, the processor 181 provides the first and second blocking frequency adjustment signals FBLK1ADJ and FBLK2ADJ to set the respective frequencies of the sinusoidal first and second blocker signals.

The processor 181 of the ATE 103 also includes I/O or communications connections 183 to a position control circuit 184 (e.g., servo position controls, etc.) to control the relative positions of the DUT 180 and the socket 178, for example, to implement pick and place automated final device testing to sequentially install and remove multiple DUTs 180 into and from the socket 178 in a high volume manufacturing process. In addition, the processor 181 includes I/O or communications connections to one or more signal output terminals 186 of the socket 178 to allow the processor 181 to obtain receive data from the installed DUT 180 during BER testing and to operate one or more circuits or systems of the installed DUT 180 for other parametric testing. In operation, the processor 181 executes a test program 190 (e.g., labeled BER TEST PROGRAM in FIG. 1) stored in the electronic memory 182 to provide the BER test transmit data BERDATA to the signal generator 101 and to store the transmitted and received BER test data 192 in the electronic memory 182 (e.g., labeled VER TX AND RX DATA). The processor 181 evaluates or computes a bit error rate of the DUT 180 according to the receive data from the DUT 180 and according to the BER test transmit data BERDATA.

Figure 2:
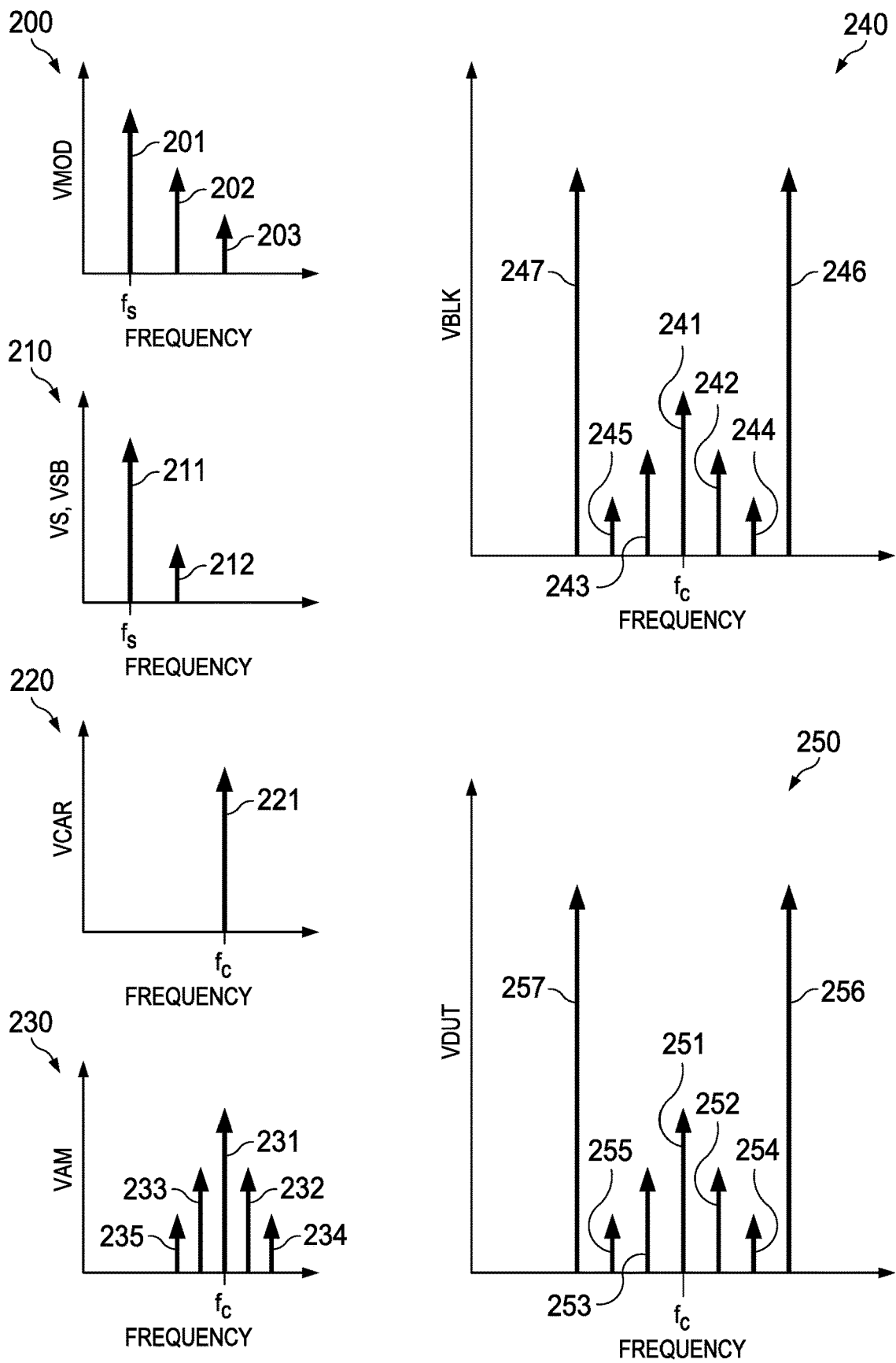
FIG. 2 is a signal diagram showing frequency response of various signals in the test system of FIG. 1.

FIG. 2 includes frequency response graphs that show example frequency domain amplitudes of various signals in the test system 100 during operation. A graph 200 shows the square wave modulating signal VMOD with a fundamental component 201 at the signal frequency $f_s$, as well as example harmonic components 202 and 203 at respectively higher frequencies. In one example, the processor 181 sets the signal frequency $f_s$ to approximately 134.2 KHz for testing receiver chip DUTs 180 for use in vehicle PKE systems. The processor 181 can change the signal frequency $f_s$ to other values for testing different DUTs in the system 100.

A graph 210 shows the frequency domain profiles of the pulse shaped modulating signal VS at the output of the pulse shaping filter circuit and the buffered pulse shaped modulating signal VSB at the pulse shaping circuit output terminal 122. The pulse shaping in this example provides a low pass filtering that substantially maintains the pre-filtering starting amplitude of the fundamental component 211 at the signal frequency $f_s$, slightly reduces the second order harmonic 212, and substantially or completely removes the higher order harmonic content. In this manner, the pulse shaping circuit 110 converts the time domain square wave shape of the original modulating signal VMOD to a waveform with an exponential envelope shape in the time domain, which emulates the presence of actual use transmit and receive antennas in a wireless transmitter-receiver system in the antenna-free test system 100.

The graph 220 in FIG. 2 shows the frequency domain content 221 of the sinusoidal carrier signal VCAR the carrier signal input terminal 133 of the modulation circuit 130, which includes a fundamental component 221 at the carrier frequency $f_c$, for example, 100 kHz. A graph 230 shows the frequency domain signal content of the amplitude modulated signal VAM that results from the modulation of the sinusoidal carrier signal VCAR with the buffered pulse shaped modulating signal VSB, including a fundamental component 231 at the carrier frequency $f_c$, sidebands 232 and 233 respectively spaced above and below the fundamental component 231 by an amount that corresponds to the spacing of the second order harmonic 212 to the fundamental component 211 in the buffered pulse shaped modulating signal VSB at the pulse shaping circuit output terminal 122, and further outlying components 234 and 235.

A graph 240 in FIG. 2 shows the frequency content of the sideband blocked amplitude modulated signal VBLK resulting from the mixing with sideband blocker signals with amplitudes approximately 200 times larger than the original modulating signal VMOD, and at respective frequencies above and below the carrier frequency $f_c$ (e.g., 160 kHz and 90 kHz). The frequency content includes the fundamental carrier component 241 (e.g., the same or similar to the fundamental component 231 and the graph 230), the sidebands 242 and 243 (e.g., the same or similar to the sidebands 232 and 233 in the graph 230), and the outlying components 244 and 245 (e.g., the same or similar to the components 234 and 235 in the graph 230). In addition, the frequency spectrum in the graph 240 includes sideband blocker components 246 and 247 respectively above and below the outlying components 244 and 245. A graph 250 in FIG. 2 shows the frequency content of the voltage applied to the receiver inputs of the DUT 180, including components 251, 252, 253, 254, 255, 256, and 257 respectively corresponding to the components 241, 242, 243, 244, 245, 246, and 247 in the graph 240.

The interface circuitry including the pulse shaping circuit 110 followed by the modulation circuit 130 and the mixer circuit 140 advantageously provides frequency spectrum content to the tested DUT 180 that closely emulates the frequency domain signal that would be received by a tested receiver chip in a system having direct modulation of a generally square wave BER test waveform, and transmit and receive antennas between the modulator and the tested chip. Accordingly, the test system 100 provide significant advantages regarding high-speed, high-volume parametric testing, such as BER testing, for receiver chips and other integrated circuits. In addition, the system 100 can be easily reconfigured for testing a different DUT 180, for example, by the processor 181 executing a different test program 190 with adjustments to one or more frequencies of the first signal generator 101 (e.g., FMODADJ), the second signal generator 136 (e.g., FCADJ), and/or the frequencies of the sideband blocker signal generators 151 and/or 155 (e.g., FBLK1ADJ, FBLK2ADJ).

In addition, the pulse shaping circuit 110 and the pulse shaping filter circuitry thereof can be adjusted, or replaced, for testing of different DUTs, for example, to model corresponding antenna artifacts, such as Q factor shaping the waveform. In one example, the pulse shaping circuit 110 can be implemented as a replaceable printed circuit board, and the system 100 can be changed quickly to accommodate different filters for testing different integrated circuits. Different designs can accommodate higher order filters, such as low-pass filters, band pass filters, etc.

In one implementation, the amplitude modulator 131 provides amplitude shift keying (ASK) and creates double sidebands around the carrier frequency $f_c$ to generate a high Q filter response. In addition, the filter-AM modulator combination makes the filter response independent of the carrier frequency $f_c$. The voltage divider resistors 141, 144, and 147 of the mixer circuit 140 after modulating the carrier signal enables ultra-low noise floor and mixing of higher power blockers. In one implementation, moreover, the system 100, and the signal generators of the ATE 103 can be implemented using a general-purpose signal generator for small signals. In addition, the buffers 111, 120, and/or 160, where included, help to isolate the filter response from device input and measurements. The pulse shaping circuit 110 advantageously changes the shape of the input pulse to achieve the required envelope that emulates end use applications with transmit and receive antennas, and the pulse shaping circuit 110 also modifies the spectrum. The shaped pulse is fed to the AM modulator for double-sideband full carrier (DSB-FC) modulation. The modulation circuit 130 modulates the pulse shaped input spectrum around the carrier frequency $f_c$.

The signal VDUT applied to the DUT 180 allows significantly better parametric testing of a receiver circuit DUT 180, and no antennas are required to perform high-speed BER testing in a manufacturing system. This allows final test of receiver integrated circuits with low cost, and easy adaptability to testing different integrated circuits with a single test system 100. In the illustrated example, the applied test signal VDUT has the bandpass response as expected from an antenna-based test setup. In one implementation, the pulse shaping filter circuit 114, 117 provides the same bandwidth (e.g., 4 kHz cutoff frequency) irrespective of the center frequency of the carrier (e.g., frequency $f_c$ at 50 kHz vs 1 MHz). In practice, this greatly improves the reliability of the test results for the error rate and other parametric tests and facilitates BER testing with 100 uV signal detection using high (e.g., 46 dB) blocker signals. With respect to vehicle PKE systems and receiver components thereof, this increases the range from ~30 m to 100 m for authentication done over low frequency 134.2 kHz using ASK data.

Figure 3:
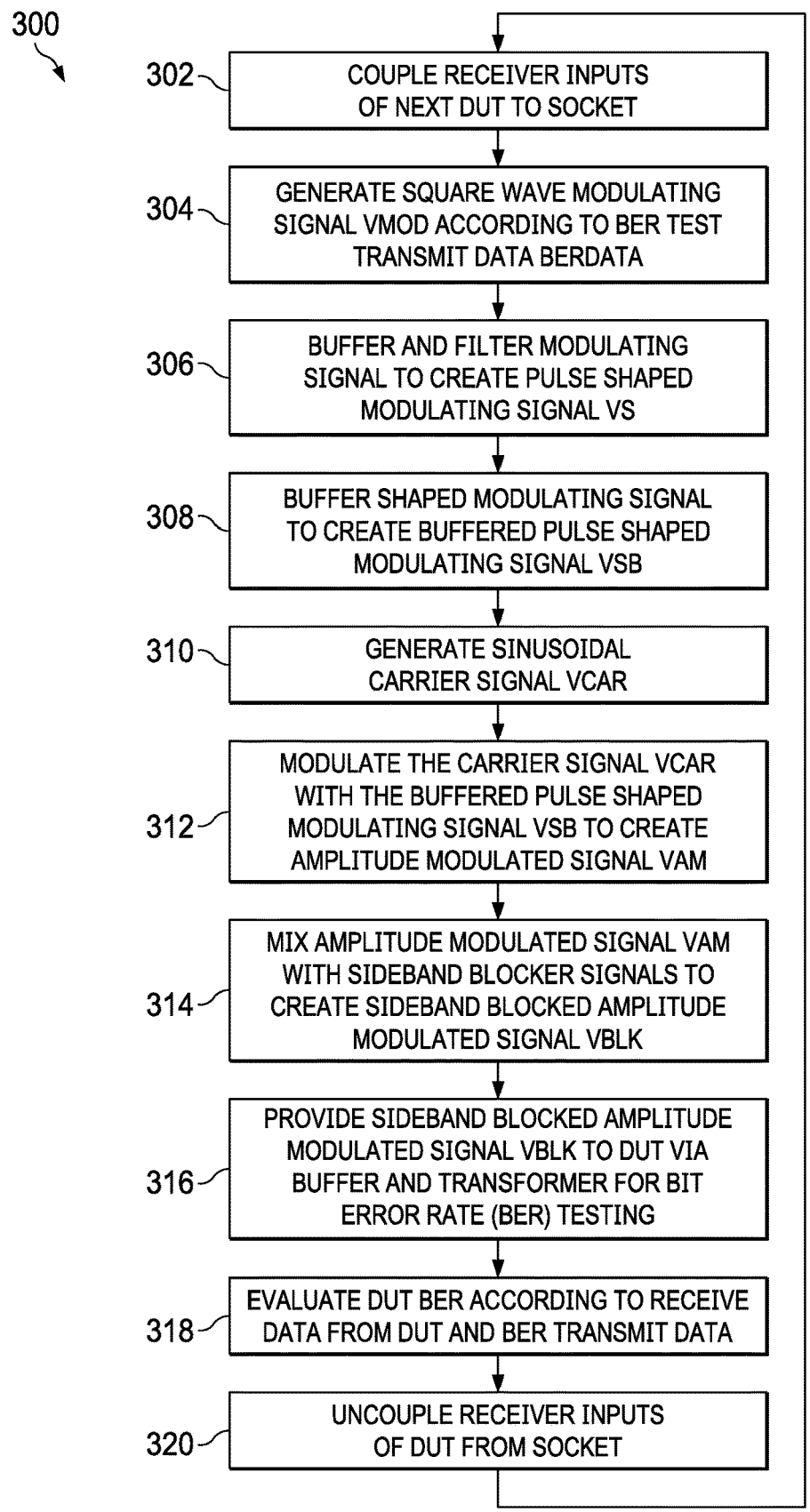
FIG. 3 is a flow diagram of a BER test method for receiver electronic devices.

FIG. 3 shows a method 300 that can be performed in automated testing using the test system 100, for example, implemented using the ATE 103 and the processor 181 thereof. The method 300 and the system 100 above facilitate generating a high Q bandpass response using the pulse shaping circuit 110 and spectral mirroring using amplitude modulation, in which the input bit pattern/signal is passed through an RC network or other filter to achieve pulse shaping. The pulse shaped signal is amplitude modulated to introduce spectral mirroring and achieve high Q.

The method 300 begins at 302 with coupling a DUT 180 to the socket 178. At 304, the method 300 further includes generating the square wave modulating signal VMOD according to BER test transmit data BERDATA. The method continues at 306 with filtering the square wave modulating signal VMOD to create the pulse shaped modulating signal VS. The method also includes generating the sinusoidal carrier signal VCAR at 310, and amplitude modulating the carrier signal VCAR with the pulse shaped modulating signal VS at 312 to create the amplitude modulated signal VAM, and providing the amplitude modulated signal VAM to the socket 178 at 316.

One implementation includes buffering the square wave modulating signal VMOD at 308 to create the buffered square wave modulating signal VMB, and amplitude modulating the carrier signal VCAR at 312 with the buffered pulse shaped modulating signal VSB to create the amplitude modulated signal VAM. The method in one example continues at 314 with mixing the amplitude modulated signal VAM with a sideband signal to create a sideband blocked amplitude modulated signal VBLK, buffering the sideband blocked amplitude modulated signal VBLK at 316 to create a buffered sideband blocked amplitude modulated signal VBLKB, and providing the buffered sideband blocked amplitude modulated signal VBLKB to the socket 178 at 316. At 318, the method 300 further includes evaluating a bit error rate of the DUT 180 according to receive data from the DUT 180 and according to the BER test transmit data BERDATA. Thereafter, the receiver inputs of the DUT 180 are uncoupled from the socket 178 at 320, and the next receiver chip DUT 180 is coupled to the socket 178 at 302 for testing as previously described.

The example system 100 and method 300 facilitate BER measurement with high dynamic range, high measurement reliability, reduced test time, and antenna-free setup by modeling antenna artifacts through pulse shaping prior to modulation. The system 100 facilitates multichannel and multisite testing for final test in a production facility, while enabling real device performance measurement that accounts for actual use antenna performance degradation in an antenna-free system and mitigates or avoids overestimating BER performance. Moreover, minimal components after the modulation circuit 130 enables high signal-to-noise testing performance (e.g., SNR>30 dB even at 25 μV carrier amplitude).

The following description provides a pulse shaping circuit design for a particular Q factor.

$$Q = \frac{f_c}{f_{opbw}},$$

Where $f_{opbw}$ is the modulated output bandwidth given as follows:

$$f_{opbw} = 2 \times f_{adB},$$

Typical response can be achieved using a first order RC filter with a resistance R and a capacitance C, designed as follows:

$$Q = \frac{f_C}{f_{opbw}} = \frac{f_C}{2 \times f_{3dB}} = \frac{f_C}{2 \times \frac{1}{2\pi RC}},$$

where Q=πRCf$_C$, f_opbw is the target bandwidth of the final output after modulation, $f_c$ is the carrier frequency, Q is the target quality factor, f3 dB is the 3-dB bandwidth of the pulse shaping circuit, R is the resistance of resistor 114 in Ohms, and C is the capacitance of the capacitor 117 in Farads. Higher order filters can be used for more specific pulse shaping.

Modifications are possible in the described examples, and other implementations are possible, within the scope of the claims.

What is claimed is:

1. A test system, comprising:
 a pulse shaping circuit, comprising: a pulse shaping circuit input terminal adapted to be coupled to a modulating signal generator output, a pulse shaping circuit output terminal, and a pulse shaping filter circuit coupled between the pulse shaping circuit input terminal and the pulse shaping circuit output terminal;
 a modulation circuit, comprising: a modulating signal input terminal coupled to the pulse shaping circuit output terminal, a carrier signal input terminal adapted to be coupled to a carrier signal generator output terminal, and a modulator output terminal; and
 a socket adapted to be coupled to a device under test (DUT), the socket comprising a signal input terminal coupled to the modulator output terminal.

2. The test system of claim 1, further comprising a mixer circuit having: a mixer input terminal coupled to the modulator output terminal; a mixer output terminal coupled to the signal input terminal of the socket; a resistor coupled between the mixer input terminal and the mixer output terminal; a first resistor coupled between a first sideband signal generator output terminal and the mixer output terminal; and a second resistor coupled between a second sideband signal generator output terminal and the mixer output terminal.

3. The test system of claim 2, further comprising:
 a first buffer having a first buffer input terminal coupled to the pulse shaping circuit input terminal, and a first buffer output terminal coupled to the pulse shaping filter circuit; and
 a second buffer having a second buffer input terminal coupled to the pulse shaping filter circuit, and a second buffer output terminal coupled to the pulse shaping circuit output terminal.

4. The test system of claim 3, further comprising a third buffer having: a third buffer input terminal coupled to the mixer output terminal; and a third buffer output terminal coupled to the signal input terminal of the socket.

5. The test system of claim 3, wherein the pulse shaping filter circuit is a first order low pass filter.

6. The test system of claim 3, wherein the pulse shaping filter circuit is a second or higher order filter.

7. The test system of claim 1, further comprising:
 a first buffer having a first buffer input terminal coupled to the pulse shaping circuit input terminal, and a first buffer output terminal coupled to the pulse shaping filter circuit; and
 a second buffer having a second buffer input terminal coupled to the pulse shaping filter circuit, and a second buffer output terminal coupled to the pulse shaping circuit output terminal.

8. The test system of claim 7, further comprising a third buffer having: a third buffer input terminal coupled to the mixer output terminal; and a third buffer output terminal coupled to the signal input terminal of the socket.

9. The test system of claim 1, wherein the pulse shaping filter circuit is a first order low pass filter.

10. The test system of claim 9, wherein the pulse shaping filter circuit comprises:
 a filter resistor having a first terminal coupled to the first buffer output terminal, and a second terminal coupled to the second buffer input terminal; and
 a filter capacitor having a first terminal coupled to the second buffer input terminal, and a second terminal coupled to a reference node.

11. The test system of claim 1, wherein the pulse shaping filter circuit is a second or higher order filter.

12. The test system of claim 1, comprising:
 an electronic memory;
 a processor configured to execute a test program stored in the electronic memory;
 a first signal generator having a first signal generator output coupled to the modulating signal generator output, a data input coupled to the processor to receive bit error rate (BER) test transmit data, and a modulating frequency input coupled to the processor to receive a modulating frequency adjustment input signal to set a signal frequency of a modulating signal at the modulating signal generator output; and
 a second signal generator having a second signal generator output coupled to the carrier signal input terminal of the modulation circuit, and a carrier frequency input coupled to the processor to receive a carrier frequency adjustment input signal to set a carrier frequency of a carrier signal at the carrier signal input terminal.

13. The test system of claim 12, wherein the socket comprises a signal output terminal coupled to the processor to provide BER test receive data from the DUT.

14. The test system of claim 12, further comprising a transformer having a primary winding coupled to the modulator output terminal, and a secondary winding;
 wherein the signal input terminal of the socket is coupled to the secondary winding.

15. A circuit, comprising:
 a pulse shaping circuit, comprising:
  a first buffer having a first buffer input terminal adapted to be coupled to a modulating signal generator output, and a first buffer output terminal,
  a pulse shaping filter circuit having a filter input terminal coupled to the first buffer output terminal, and a filter output terminal, and
  a second buffer having a second buffer input terminal coupled to the filter output terminal, and a second buffer output terminal;
 an amplitude modulator having a modulating signal input terminal coupled to the second buffer output terminal, a carrier signal input terminal adapted to be coupled to a carrier signal generator output terminal, and a modulator output terminal;
 a third buffer having a third buffer input terminal coupled to the modulator output terminal, and a third buffer output terminal; and
 a socket adapted to be coupled to a device under test (DUT), the socket comprising a signal input terminal coupled to the third buffer output terminal, and a signal output terminal adapted to be coupled to a processor.

16. The circuit of claim 15, further comprising a mixer circuit having a mixer input terminal coupled to the modulator output terminal, a mixer output terminal coupled to the input terminal of the socket; a resistor coupled between the mixer input terminal and the mixer output terminal; a first resistor coupled between a first sideband signal generator output terminal and the mixer output terminal; and a second resistor coupled between a second sideband signal generator output terminal and the mixer output terminal.

17. The circuit of claim 15, wherein the pulse shaping filter circuit is a first order low pass filter.

18. A method, comprising:
coupling a device under test (DUT) to a socket;
generating a square wave modulating signal according to bit error rate (BER) test transmit data;
filtering the square wave modulating signal to create a pulse shaped modulating signal;
amplitude modulating a carrier signal with the pulse shaped modulating signal to create an amplitude modulated signal;
providing the amplitude modulated signal to the socket; and
evaluating a bit error rate of the DUT according to receive data from the DUT and according to the BER test transmit data.

19. The method of claim 18, further comprising:
buffering the square wave modulating signal to create a buffered square wave modulating signal;
filtering the buffered square wave modulating signal to create the pulse shaped modulating signal;
buffering the pulse shaped modulating signal to create a buffered pulse shaped modulating signal; and
amplitude modulating the carrier signal with the buffered pulse shaped modulating signal to create the amplitude modulated signal.

20. The method of claim 19, further comprising:
mixing the amplitude modulated signal with a sideband signal to create a sideband blocked amplitude modulated signal;
buffering the sideband blocked amplitude modulated signal to create a buffered sideband blocked amplitude modulated signal; and
providing the buffered sideband blocked amplitude modulated signal to the socket.

* * * * *